(12) United States Patent
Connor

(10) Patent No.: US 11,120,699 B2
(45) Date of Patent: Sep. 14, 2021

(54) PREDICTIVE WIND GUST ALLEVIATION USING OPTICAL VELOCITY SENSING

(71) Applicant: LOCKHEED MARTIN CORPORATION, Bethesda, MD (US)

(72) Inventor: Michael A. Connor, New Haven, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 194 days.

(21) Appl. No.: 16/586,059

(22) Filed: Sep. 27, 2019

(65) Prior Publication Data

US 2021/0097874 A1 Apr. 1, 2021

(51) Int. Cl.
| | | |
|---|---|---|
| *G05D 1/00* | (2006.01) | |
| *G08G 5/06* | (2006.01) | |
| *G01P 5/26* | (2006.01) | |
| *B64C 13/20* | (2006.01) | |
| *G01W 1/00* | (2006.01) | |

(52) U.S. Cl.
CPC ............. *G08G 5/065* (2013.01); *B64C 13/20* (2013.01); *G01P 5/26* (2013.01); *G01W 2001/003* (2013.01)

(58) Field of Classification Search
CPC .... G08G 5/065; G08G 5/0052; G08G 5/0091; G08G 5/0021; G01P 5/26; B64C 13/20; B64C 13/18; G01W 2001/003; G05D 1/102; G05D 1/106; G05D 1/00
USPC .......................................................... 701/7
See application file for complete search history.

(56) References Cited

U.S. PATENT DOCUMENTS

| | | | | |
|---|---|---|---|---|
| 2003/0009268 | A1* | 1/2003 | Inokuchi | G01S 17/95 701/14 |
| 2005/0165517 | A1* | 7/2005 | Reich | A63H 27/12 701/11 |
| 2007/0171397 | A1* | 7/2007 | Halldorsson | G01S 7/497 356/28.5 |
| 2017/0010358 | A1* | 1/2017 | Koch | G01S 17/95 |
| 2019/0025420 | A1* | 1/2019 | Frick | G01S 13/589 |

FOREIGN PATENT DOCUMENTS

EP 2133712 A1 12/2009

* cited by examiner

*Primary Examiner* — Shardul D Patel
(74) *Attorney, Agent, or Firm* — Michael Best & Friedrich LLP

(57) ABSTRACT

An apparatus for guiding an aircraft includes: an air velocity sensor disposed on the aircraft and configured to sense a speed and direction of a wind remote to the aircraft to provide remote wind speed and direction data; a flight control actuator coupled to a flight control device; and a flight controller communicably coupled to the air velocity sensor, the flight controller having an input section that receives the remote wind speed and direction data from the air velocity sensor, a processor configured to determine a magnitude and direction of the wind with respect to a planned flight route and to predict an influence acting on the aircraft due to the magnitude and direction of the wind with respect to the planned flight route, and an output section communicably coupled to the flight control actuator to provide a control signal that results in the aircraft counteracting the predicted influence.

20 Claims, 4 Drawing Sheets

PREDICTIVE WIND GUST ALLEVIATION USING OPTICAL VELOCITY SENSING

BACKGROUND

The embodiments disclosed herein relate to minimizing error between an aircraft's current state and planned route, and more particularly to minimizing the error due to unanticipated wind shear or wind gusts.

Conventional aircraft automatic flight control systems follow navigational routes by using inertial measurements, global positioning system (GPS) measurements, and pitot static air sensor measurement data to continuously monitor the aircraft's current state and minimize error between the current state and the planned flight route. However, unanticipated wind shear and gusting can impart significant aircraft perturbations resulting in flight path deviations. Automatic corrections to the flight path deviations using the above-noted measurements are limited by the reactive nature of the aircraft's sensors.

BRIEF DESCRIPTION

Disclosed is an apparatus for guiding an aircraft. The apparatus includes: an air velocity sensor disposed on the aircraft and configured to sense a speed and direction of a wind remote to the aircraft to provide remote wind speed and direction data; a flight control actuator coupled to a flight control device; and a flight controller communicably coupled to the air velocity sensor, the flight controller having an input section that receives the remote wind speed and direction data from the air velocity sensor, a processor configured to determine a magnitude and direction of the wind with respect to a planned flight route of the aircraft and to predict an influence acting on the aircraft due to the magnitude and direction of the wind with respect to the planned flight route, and an output section communicably coupled to the flight control actuator to provide a control signal that results in the aircraft counteracting the predicted influence.

Also disclosed is a method for guiding an aircraft. The method includes: sensing a speed and direction of a wind remote to the aircraft using an air velocity sensor disposed on the aircraft to provide remote wind speed and direction data; determining a magnitude and direction of the wind with respect to a planned flight route of the aircraft using a flight controller that receives the remote wind speed and direction data; predicting an influence acting on the aircraft due to the magnitude and direction of the wind with respect to the planned flight route using the flight controller; and controlling with the flight controller a flight control actuator coupled to a flight control device for controlling the aircraft to counteract the predicted influence.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
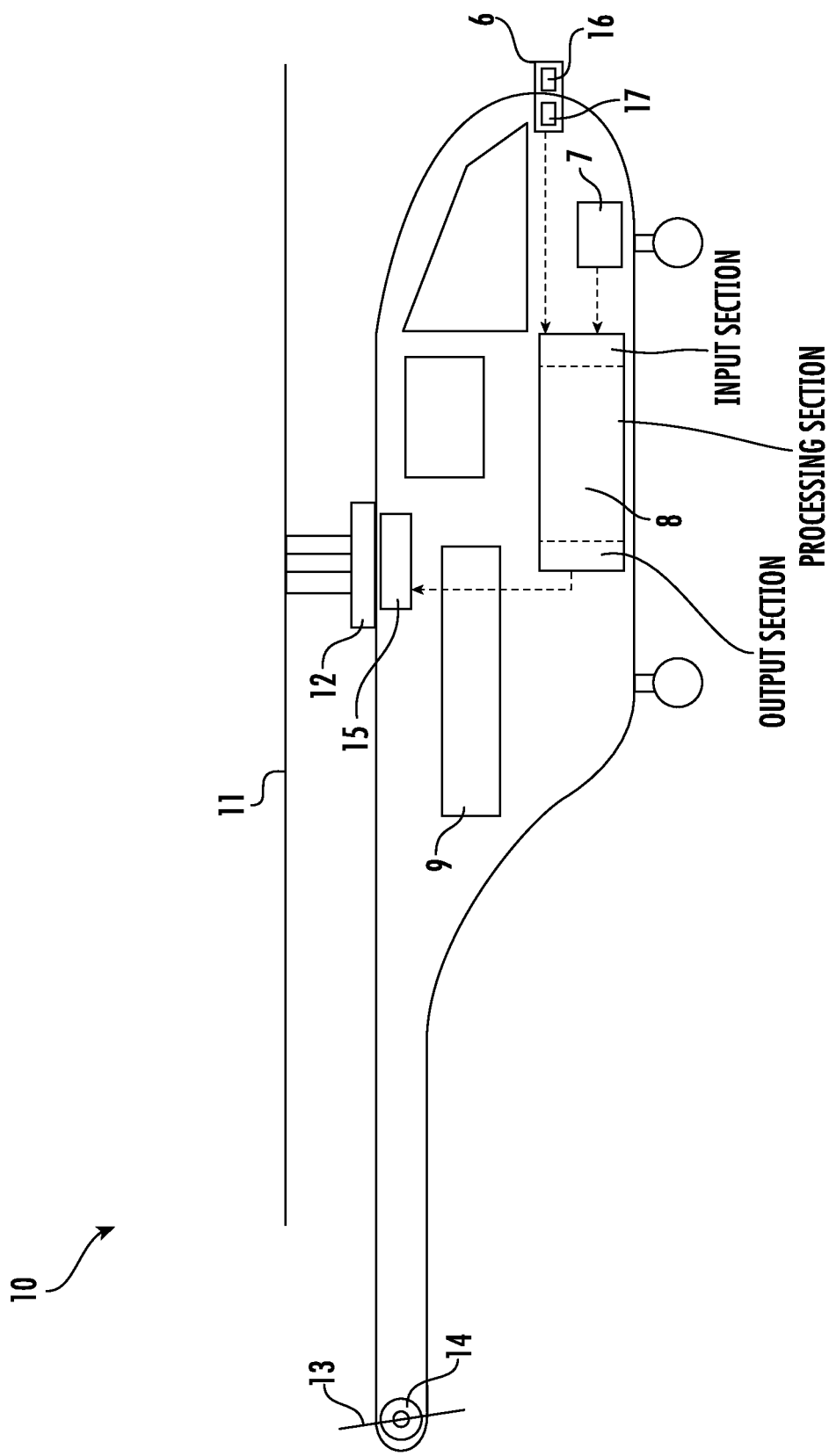
FIG. 1 is a cross-sectional view of a rotary wing aircraft having an optical air velocity sensor.

FIG. 1 illustrates an example of a rotary wing aircraft 10. While the teachings herein are directed to the rotary wing aircraft 10, the teachings also apply to other types of aircraft such as fixed wing aircraft. The rotary wing aircraft 10 includes a main rotor 11 for lift and translational movement and a tail rotor 13 for directional control. Power for the main rotor 11 and the tail rotor 13 is provided by a power train 9, which includes an engine and transmission. Pitch of the main rotor 11 is controlled by a main rotor pitch control device 12, such as a swashplate and control linkage. The main rotor pitch control device 12 may provide for collective and cyclic pitch control. Pitch control of the tail rotor 13 is controlled by a tail rotor pitch control device 14. A flight control actuator 15 is configured to provide input movement to the main rotor pitch control device 12 and the tail rotor pitch control device 14 for automatic flight control. The actuator 15 may be implemented by a hydraulically-operated or electrically-operated piston in one or more non-limiting embodiments.

The rotary wing aircraft 10 also includes a flight controller 8. The flight controller 8 is configured to automatically control a flight path of the rotary wing aircraft 10 by providing a control output to the actuator 15. In general, the flight path is controlled such as to maintain a desired flight route, which is input into the flight controller 8. The flight controller 8 includes an input section, a processing section, and an output section. The input section is configured to receive signals such as sensed data from a sensor and may include components such as an analog-to-digital converter, a digital-to-analog converter, an amplifier, and/or a communications interface (e.g., wired or wireless). The output section is configured to send signals such as control signals to the flight control actuator and may include components similar to the components included in the input section. The processing section is configured to process data received by the input section in order to output signals from the output section. The processing section may include a processor (digital and/or analog), memory, and other components as necessary to execute an algorithm to automatically control the flight path. In one or more embodiments, the algorithm is a first algorithm based on receiving inputs from one or more navigational sensors 7 such a GPS sensor, an inertial sensor, and/or a pitot static air pressure sensor in one or more non-limiting embodiments. The first algorithm is generally reactive in nature such that the navigational data sensed by the navigational sensors provides indication to the flight controller 8 relating to the rotary wing aircraft 10 straying or deviating from the desired flight route. Based on the indication of deviation from the desired flight route, the flight controller 8 provides automatic control output to the actuator 15 to urge the aircraft 10 back onto the desired flight route. The first algorithm may employ different control strategies such as proportional, integral, and/or differential control.

The rotary wing aircraft 10 further includes an optical air velocity sensor 6. The optical air velocity sensor 6 is configured to optically sense air or wind speed and direction. In one or more embodiments, multiple beams of light are emitted by the optical air velocity sensor 6 above and below the rotary wing aircraft 10. In one or more embodiments, the light beams are emitted by one or more collimated light sources 16 such as a laser. The multiple beams are aimed in a direction in front of or along the forward flight path of the aircraft 10 such that the aimed direction has at least a vector component along the forward flight path of the aircraft 10. Light that is reflected due to the emitted light is received and analyzed by one or more optical sensors 17 in the optical air velocity sensor 6 to determine the wind speed and direction of the wind flow immediately in front of the aircraft 10. One example of the optical air velocity sensor 6 is referred to as the WINDSCEPTORO and is available from Optical Air Data Systems of Manassas, Va. In that optical air velocity sensors are known in the art, they are not discussed in further detail.

The optical air velocity sensor 6 is communicably coupled (e.g., electrically and/or optically) to the flight controller 8. Wind velocity data from the optical air velocity sensor 6 is processed using a second algorithm either by itself or in conjunction with the first algorithm. The second algorithm is predictive in nature in that it predicts what influence a wind such as a cross-wind or wind shear will have on the aircraft 10 and provide an anticipatory steering correction that is input to the actuator 15 in order to counteract the cross-wind.

Figure 2:
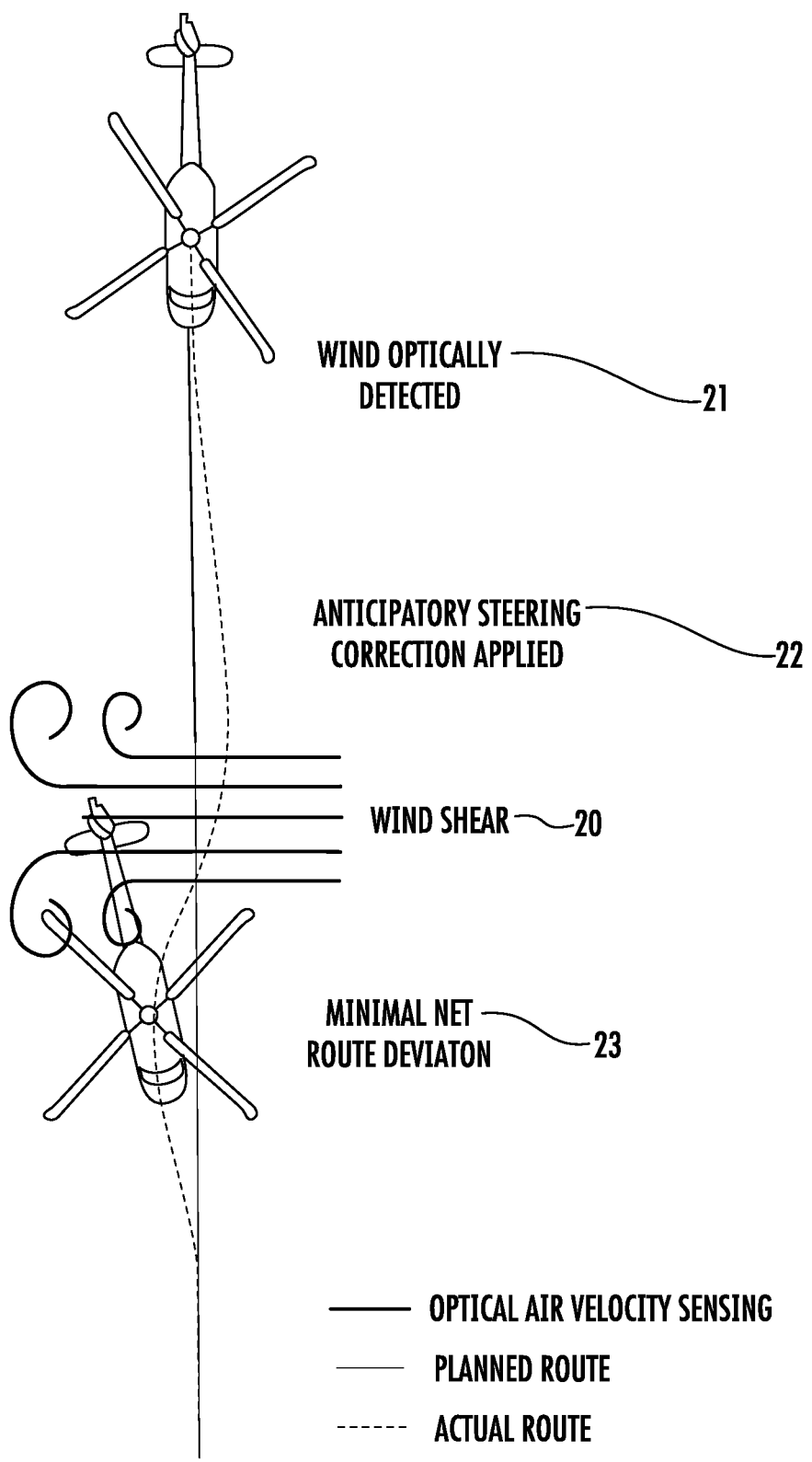
FIG. 2 depicts aspects of applying an anticipatory steering correction to the rotary wing aircraft due to detected wind shear.

FIG. 2 illustrates a top-view of one example of an anticipatory steering correction applied to the rotary wing aircraft 10 due to sensed wind shear in front of the aircraft 10. A wind shear is illustrated at 20. The wind shear relates to a vector component of wind velocity or speed that is perpendicular or orthogonal to a planned flight route. The orthogonal component of wind speed will tend to urge the aircraft 10 from the planned flight route. At 21, the wind speed and direction ahead of the aircraft 10 is optically detected using the optical air velocity sensor 6. The flight controller 8 will determine the orthogonal wind speed from the data provided by the optical air velocity sensor 6 and apply an anticipatory steering correction that is based on the orthogonal wind speed using the second algorithm at 22. The aircraft 10 encounters the wind shear at 20 and has a slight deviation from the planned flight route at 23. The deviation at 23 is minimal due to the anticipatory steering correction. The flight controller 8 at 23 can then put the aircraft 10 back on the planned flight route using the first algorithm based on input from the navigational sensors. While this example discusses horizontal deviations due to wind gusts, the teachings may also be applied to wind gusts that can force the aircraft up or down in order for the aircraft to maintain a constant altitude. Hence, the teachings may also be applied to wind gusts that force the aircraft in a horizontal direction in combination with a vertical direction. In addition to the vertical and lateral wind effects, an aircraft may be susceptible to longitudinal (i.e., forward or rearward) wind dynamics, especially at low speeds, and thus the teachings may also be applied to longitudinal wind dynamics. In response to longitudinal wind dynamics, the flight controller 8 can apply more or less longitudinal force to keep the aircraft 10 at a selected constant speed along the planned flight route.

Figure 3:
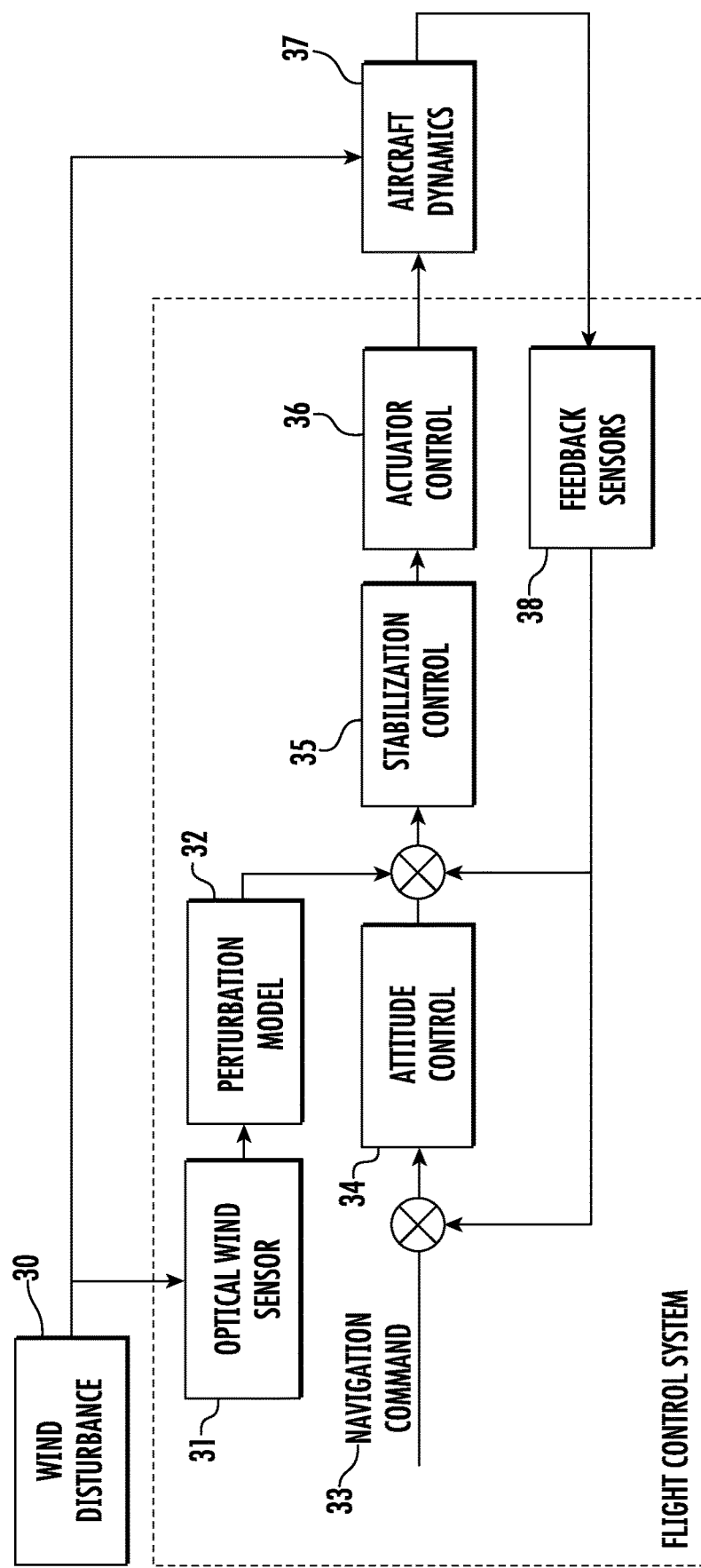
FIG. 3 illustrates a block diagram depicting aspects of an example of an algorithm implemented by a flight controller for applying the anticipatory steering correction.

FIG. 3 illustrates a block diagram depicting aspects of an example of an algorithm implemented by a flight controller. This algorithm includes feed-forward stabilization provided by optical wind sensing and a perturbation model. Wind disturbance is illustrated at 30. Speed and direction of the wind disturbance is sensed by the optical wind sensor at 31 and provides wind speed and direction to a perturbation model at 32. The perturbation model determines the influence or force of the wind speed dynamics on the aircraft 10. The influence or force of the wind speed dynamics on the aircraft 10 can be in one, two, or three dimensions. In one or more embodiments, the perturbation model determines the vector component of wind speed that is orthogonal to the planned flight route. Factors determining the influence or force include the cross-sectional area and shape of the aircraft 10 in addition to the wind speed dynamics and directionality. The influence or force can be determined by analysis of the particular aircraft of interest and/or testing of the aircraft of interest for various directional wind speed magnitudes. In one or more embodiments, the perturbation model can use a look-up table or mathematical expression to determine the influence or force imposed on the aircraft 10 for a particular value of directional wind speed. By knowing the influence or force imposed on the aircraft 10, the flight controller 8 can counteract that influence or force to keep the aircraft 10 on the planned flight route and/or at a selected constant speed such as by using the appropriate counteracting tail rotor or cyclic control response. The counteracting tail rotor or cyclic control response provides an influence or force having a value that opposes and is approximately the same as the orthogonal influence or force due to the wind disturbance on the aircraft 10. With tail rotor control, a nose of the aircraft 10 can be pointed towards the wind shear component of the wind disturbance. With cyclic control, a portion of translational force due to the main rotor can be directed against the wind shear without changing the direction of the nose.

Navigation command at 33 provides the planned fight route. Attitude control at 34 provides the aircraft attitude necessary to follow the planned flight route. Stabilization control at 35 combines the influence or force from the perturbation model with the attitude control and feedback sensor input (discussed below) to provide a stabilized input to the actuator control at 36 for controlling the aircraft motivators (e.g., main rotor and/or tail rotor). Aircraft dynamics at 37 reflect the response of the aircraft to the wind disturbance and the actuator control. Feedback sensors at 38, such as the navigational sensors, sense the aircraft dynamic response and provide a feedback response signal to the attitude control and the stabilization control blocks to provide further correction if necessary.

Figure 4:
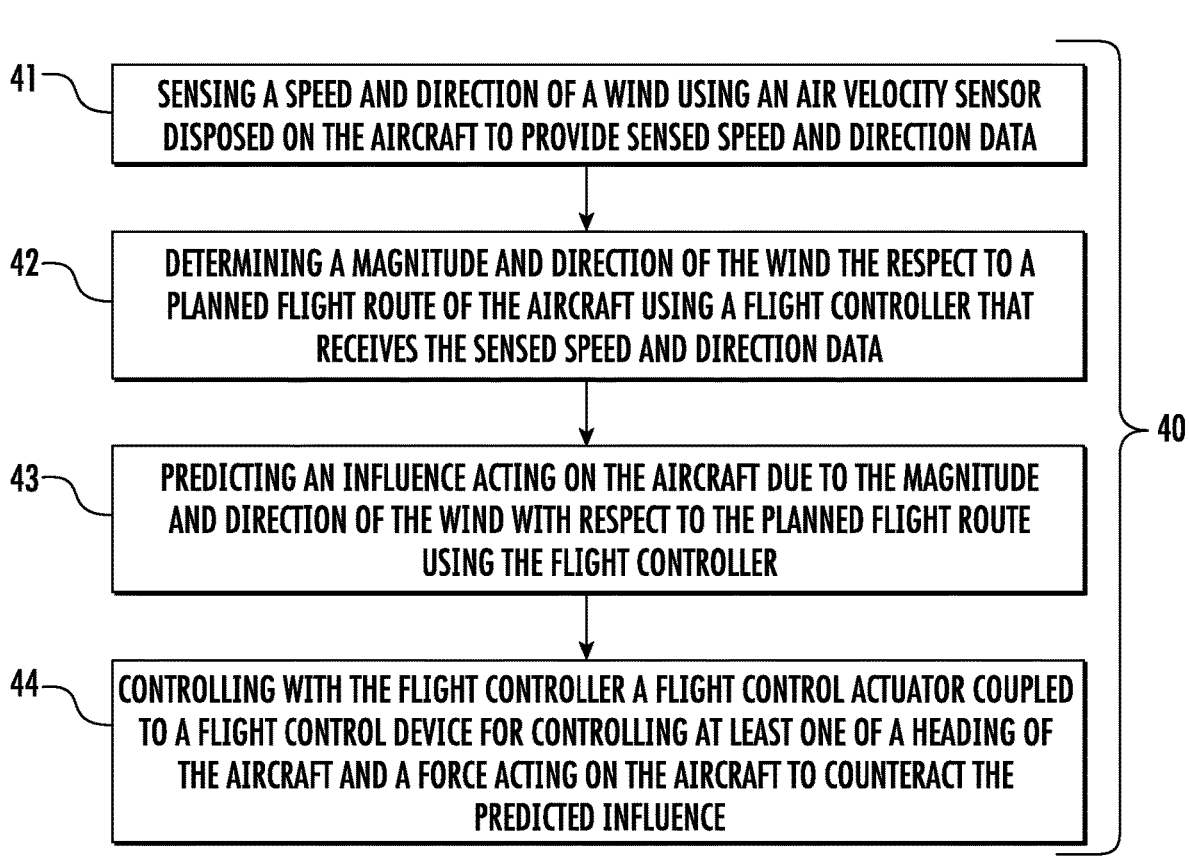
FIG. 4 is a flow chart for an example of a method for guiding an aircraft subject to a wind.

FIG. 4 is a flow chart for a method 40 for guiding an aircraft. Block 41 calls for sensing a speed and direction of a wind remote to the aircraft using an air velocity sensor disposed on the aircraft to provide remote wind speed and direction data. Block 42 calls for determining a magnitude and direction of the wind with respect to a planned flight route of the aircraft using a flight controller that receives the remote wind speed and direction data. The magnitude and direction of the wind with respect to a planned flight route of the aircraft can be determined for example by using geometric calculations that take into account the sensed wind speed and direction, the orientation of the aircraft, and planned flight route of the aircraft. Block 42 may also include determining a vector component of the wind magnitude that is orthogonal to the planned flight route of the aircraft. The vector component can be horizontal, vertical, or diagonal. Block 42 may also include determining a longitudinal component of the wind magnitude with respect to the planned flight route of the aircraft. Block 43 calls for predicting an influence acting on the aircraft due to the magnitude and direction of the wind with respect to the planned flight route using the flight controller. In one or more embodiments, the influence is a force vector (i.e., force magnitude and force direction). Block 44 calls for controlling with the flight controller a flight control actuator coupled to a flight control device for controlling at least one of a heading of the aircraft and a force acting on the aircraft to counteract the predicted influence. The term "heading" relates to the direction that the nose of the aircraft is pointing towards. Controlling at least one of a heading of the aircraft and a force acting on the aircraft to counteract the predicted influence can result in maintaining the planned route or course of the aircraft. Non-limiting embodiments of the aircraft control device include a swashplate for a main rotor or a tail rotor in a rotary wing aircraft and a rudder, an elevator, and an aileron for fixed wing aircraft. Hybrid aircraft may use a combination of the foregoing devices.

It can be appreciated that reactive control receiving input from navigation sensors may also be used in combination with disclosed predictive control in order to provide less deviation from the planned flight route in some instances.

The apparatuses and methods disclosed herein provide several advantages. One advantage is that they provide from improved aircraft control, which can be particularly necessary in obstacle rich environments. Another advantage is that navigational performance in enhanced or more accurate with less deviation from a planned flight path. Yet, another advantage is improved passenger ride quality resulting from the less deviation that requires less aircraft movement.

Set forth below are some embodiments of the foregoing disclosure:

Embodiment 1: An apparatus for guiding an aircraft comprises an air velocity sensor disposed on the aircraft and configured to sense a speed and direction of a wind remote to the aircraft to provide remote wind speed and direction data. The apparatus also comprises a flight control actuator coupled to a flight control device. The apparatus also comprises a flight controller communicably coupled to the air velocity sensor, the flight controller comprising an input section that receives the remote wind speed and direction data from the air velocity sensor, a processor configured to determine a magnitude and direction of the wind with respect to a planned flight route of the aircraft and to predict an influence acting on the aircraft due to the magnitude and direction of the wind with respect to the planned flight route, and an output section communicably coupled to the flight control actuator to provide a control signal that results in the aircraft counteracting the predicted influence.

Embodiment 2: The apparatus for guiding an aircraft as in any prior embodiment or combination of embodiments, wherein the apparatus comprises a navigation sensor, wherein the processor is further configured to provide the control signal based on a deviation from the planned flight route based on data from the navigation sensor.

Embodiment 3: The apparatus for guiding an aircraft as in any prior embodiment or combination of embodiments wherein the navigation sensor comprises at least one of an inertia sensor, a global position system (GPS) sensor, and a pitot air pressure sensor Embodiment 4: The apparatus for guiding an aircraft as in any prior embodiment or combination of embodiments wherein the aircraft is a rotary wing aircraft.

Embodiment 5: The apparatus for guiding an aircraft as in any prior embodiment or combination of embodiments wherein the flight control device comprises a swashplate.

Embodiment 6: The apparatus for guiding an aircraft as in any prior embodiment or combination of embodiments wherein the air velocity sensor comprises an optical air velocity sensor that comprises one or more collimated light sources and optical sensors.

Embodiment 7: The apparatus for guiding an aircraft as in any prior embodiment or combination of embodiments wherein the air velocity sensor is aimed in a direction along a forward flight path of the aircraft.

Embodiment 8: The apparatus for guiding an aircraft as in any prior embodiment or combination of embodiments wherein the processor is further configured to determine a vector component of the wind magnitude orthogonal to the planned flight route.

Embodiment 9: The apparatus for guiding an aircraft as in any prior embodiment or combination of embodiments wherein the processor is further configured to determine a longitudinal component of the wind magnitude with respect to the planned flight route.

Embodiment 10: The apparatus for guiding an aircraft as in any prior embodiment or combination of embodiments wherein the control signal results in at least one of a heading of the aircraft and a force acting on the aircraft counteracting the predicted influence.

Embodiment 11: The apparatus for guiding an aircraft as in any prior embodiment or combination of embodiments wherein the at least one of the heading of the aircraft and the force acting on the aircraft maintains the aircraft on the planned flight route.

Embodiment 12: A method for guiding an aicraft comprises sensing a speed and direction of a wind remote to the aircraft using an air velocity sensor disposed on the aircraft to provide remote wind speed and direction data, determining a magnitude and direction of the wind with respect to a planned flight route of the aircraft using a flight controller that receives the remote wind speed and direction data, predicting an influence acting on the aircraft due to the magnitude and direction of the wind with respect to the planned flight route using the flight controller; and controlling with the flight controller a flight control actuator coupled to a flight control device for controlling the aircraft to counteract the predicted influence.

Embodiment 13: The method as in any prior embodiment or combination of embodiments, further comprising emitting a beam of light from the air velocity sensor in order to sense the speed and the direction of the wind.

Embodiment 14: The method as in any prior embodiment or combination of embodiments, further comprising sensing a position of the aircraft using a navigation sensor and sending navigation data from the navigation sensor to the flight controller.

Embodiment 15: The method as in any prior embodiment or combination of embodiments, further comprising using the navigation data to control the flight control actuator to correct for deviation from the planned flight route.

Embodiment 16: The method as in any prior embodiment or combination of embodiments, further comprising determining a vector component of the wind speed orthogonal to the planned flight route.

Embodiment 17: The method as in any prior embodiment or combination of embodiments, further comprising determining a longitudinal component of the wind speed with respect to the planned flight route.

Embodiment 18: The method as in any prior embodiment or combination of embodiments, wherein the aircraft is a rotary wing aircraft.

Embodiment 19: The method as in any prior embodiment or combination of embodiments, wherein controlling the aircraft comprises controlling at least one of a heading of the aircraft and a force acting on the aircraft to counteract the predicted influence.

Embodiment 20: The method as in any prior embodiment or combination of embodiments, wherein the at least one of the heading of the aircraft and the force acting on the aircraft maintains the aircraft on the planned flight route.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" do not denote a specific order but are intended to distinguish elements.

The disclosure illustratively disclosed herein may be practiced in the absence of any element which is not specifically disclosed herein.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An apparatus for guiding an aircraft, the apparatus comprising:
    an air velocity sensor disposed on the aircraft and configured to sense a speed and direction of a wind remote to the aircraft to provide remote wind speed and direction data;
    a flight control actuator coupled to a flight control device; and
    a flight controller communicably coupled to the air velocity sensor, the flight controller comprising an input section that receives the remote wind speed and direction data from the air velocity sensor, a processor configured to determine a magnitude and direction of the wind with respect to a planned flight route of the aircraft and to predict an influence acting on the aircraft due to the magnitude and direction of the wind with respect to the planned flight route, and an output section communicably coupled to the flight control actuator to provide a control signal that results in the aircraft counteracting the predicted influence.

2. The apparatus according to claim 1, further comprising a navigation sensor, wherein the processor is further configured to provide the control signal based on a deviation from the planned flight route based on data from the navigation sensor.

3. The apparatus according to claim 2, wherein the navigation sensor comprises at least one of an inertia sensor, a global position system (GPS) sensor, and a pitot air pressure sensor.

4. The apparatus according to claim 1, wherein the aircraft is a rotary wing aircraft.

5. The apparatus according to claim 3, wherein the flight control device comprises a swashplate.

6. The apparatus according to claim 1, wherein the air velocity sensor comprises an optical air velocity sensor that comprises one or more collimated light sources and optical sensors.

7. The apparatus according to claim 1, wherein the air velocity sensor is aimed in a direction along a forward flight path of the aircraft.

8. The apparatus according to claim 1, wherein the processor is further configured to determine a vector component of the wind magnitude orthogonal to the planned flight route.

9. The apparatus according to claim 1, wherein the processor is further configured to determine a longitudinal component of the wind magnitude with respect to the planned flight route.

10. The apparatus according to claim 1, wherein the control signal results in at least one of a heading of the aircraft and a force acting on the aircraft counteracting the predicted influence.

11. The apparatus according to claim 10, wherein the at least one of the heading of the aircraft and the force acting on the aircraft maintains the aircraft on the planned flight route.

12. A method for guiding an aircraft, the method comprising:
    sensing a speed and direction of a wind remote to the aircraft using an air velocity sensor disposed on the aircraft to provide remote wind speed and direction data;
    determining a magnitude and direction of the wind with respect to a planned flight route of the aircraft using a flight controller that receives the remote wind speed and direction data;
    predicting an influence acting on the aircraft due to the magnitude and direction of the wind with respect to the planned flight route using the flight controller; and
    controlling with the flight controller a flight control actuator coupled to a flight control device for controlling the aircraft to counteract the predicted influence.

13. The method according to claim 12, further comprising emitting a beam of light from the air velocity sensor in order to sense the speed and the direction of the wind.

14. The method according to claim 12, further comprising sensing a position of the aircraft using a navigation sensor and sending navigation data from the navigation sensor to the flight controller.

15. The method according to claim 12, further comprising using the navigation data to control the flight control actuator to correct for deviation from the planned flight route.

16. The method according to claim 12, further comprising determining a vector component of the wind speed orthogonal to the planned flight route.

17. The method according to claim 12, further comprising determining a longitudinal component of the wind speed with respect to the planned flight route.

18. The method according to claim 12, wherein the aircraft is a rotary wing aircraft.

19. The method according to claim 12, wherein controlling the aircraft comprises controlling at least one of a heading of the aircraft and a force acting on the aircraft to counteract the predicted influence.

20. The method according to claim 19, wherein the at least one of the heading of the aircraft and the force acting on the aircraft maintains the aircraft on the planned flight route.

* * * * *